United States Patent [19]

Vassallo et al.

[11] Patent Number: 4,474,392
[45] Date of Patent: Oct. 2, 1984

[54] PIPE FITTING CONSTRUCTION

[76] Inventors: Efrain D. Vassallo, La Rambla G-558; Jose E. Valls, Perla del Sur B-143, both of Ponce, P.R. 00731

[21] Appl. No.: 468,320

[22] Filed: Feb. 22, 1983

Related U.S. Application Data

[63] Continuation of Ser. No. 207,018, Nov. 14, 1980.

[51] Int. Cl.³ ............................................. F16L 17/02
[52] U.S. Cl. .................................... 285/347; 285/423; 285/DIG. 22
[58] Field of Search ............... 285/DIG. 22, 423, 260, 285/347, 379, 319, DIG. 7

[56] References Cited

U.S. PATENT DOCUMENTS

| | | | |
|---|---|---|---|
| 1,667,735 | 8/1875 | Walworth | 285/DIG. 16 |
| 2,507,535 | 5/1950 | Madsen | 285/DIG. 22 |
| 2,735,699 | 2/1956 | Chadbourne | 285/423 X |
| 2,871,031 | 1/1959 | Altemus et al. | 285/111 X |
| 3,784,235 | 1/1974 | Kessler | 285/DIG. 22 |
| 3,792,878 | 2/1974 | Freeman | 285/347 X |
| 3,860,270 | 1/1975 | Arnold | 285/DIG. 16 |
| 4,143,884 | 3/1978 | Nicholas et al. | 285/DIG. 22 |

FOREIGN PATENT DOCUMENTS

| | | | |
|---|---|---|---|
| 978055 | 12/1964 | United Kingdom | 285/347 |
| 1223276 | 2/1971 | United Kingdom | 285/DIG. 22 |

OTHER PUBLICATIONS

Vassallo Industries Catalog "Gosk-o-Weld" Revised Nov. 1, 1978.

Primary Examiner—Dave W. Arola
Attorney, Agent, or Firm—Karl L. Spivak

[57] ABSTRACT

The pipe fitting includes a center body of predetermined configuration, for example, wye or tee shape, of desired pipe size. The center body terminates at each of its ends in a lock junction to receive thereon in locked relationship an end hub of the type suitable for receiving and interconnecting the spigot end of a length of plastic pipe. Each lock junction includes a shoulder upon which the end hub is seated, an endwardly positioned lock and a circular, peripheral recess positioned between the shoulder and the lock. The end hub includes an inwardly inclined projection to cooperate with and securely seat within the center body lock. A circular gasket is secured within the circular recess and biases against a portion of the inner periphery of the end hub to prevent leakage between the parts.

7 Claims, 3 Drawing Figures

U.S. Patent    Oct. 2, 1984    Sheet 2 of 2    4,474,392

PIPE FITTING CONSTRUCTION

This is a continuation, of application Ser. No. 207,018, filed Nov. 14, 1980.

BACKGROUND OF THE INVENTION

The present invention relates generally to the field of plastic pipe fittings, and more particularly, is directed to an improved pipe fitting construction system including integral locking and sealing features.

In piping systems in general and in plastic piping systems in particular, it is the usual practice to provide lengths of pipe in suitable increments, such as ten feet or twenty feet, for use in constructing a pipe line of a desired size. Each pipe length is fabricated to the designed internal diameter, usually by the extrusion process, and then has its ends worked as necessary to provide one bell or hub end and one spigot end of predetermined interrelating design to allow adjacent lengths of pipe to be joined in a secure and leak proof manner.

Usual fittings such as tees and wyes are employed where design criteria require, and such fittings form the subject matter of the present invention. Fittings of smaller sizes are generally molded or are otherwise formed for use with pipe sections of equal diameter. In the case of larger diameter work, the molding process cannot normally be economically employed and accordingly it is common practice to fabricate large diameter fittings of separate molded or extruded plastic components and then to join the separate parts together. For example when fabricating a wye fitting of twelve inch diameter, the center part in the configuration of the wye shape was first formed. Each of the three wye ends was then equipped with a bell or hub of suitable configuration to receive and seal against the spigot end of an interconnecting length of plastic pipe. In order to generate sufficient strength in each hub connection and to assure a leak proof fitting, a solvent weld or chemical junction was first formed between a hub and one free end of the wye center body. After all of the hubs were solvent welded in place, a second plastic weld or peripheral heat junction was then applied at each connected hub. These operations have proved to be time consuming, costly and subject to frequent quality control rejections. The fitting construction of the present invention seeks to overcome all of the problems incident to the present pipe fitting construction techniques. As used herein, the term "large diameter" is defined to mean pipe sizes twelve inches in diameter and larger.

SUMMARY OF THE INVENTION

The present invention relates generally to the field of fittings for plastic pipes, and more particularly, is directed to novel pipe fitting construction featuring self-locking and self-sealing components.

A fitting center body member is formed in usual manner to the desired configuration such as a wye or a tee having conventional predetermined inside diameter conforming to usual pipe sizes, for example, twelve inches, fourteen inches, and the like. Each end of the fitting center body is formed with a lock junction means to receive and lock thereon a hub member in a leak-proof relationship. The hub members are preferably of usual hub design which may or may not include a peripheral groove and gasket seated therein for joining the spigot end of an adjacent length of pipe. Each hub member includes a circular, inwardly inclined projection means of suitable configuration to slide over and lock upon the center body lock junction means to thereby provide a self locking construction.

The lock junction means comprises generally a radially outwardly projecting shoulder which is spaced rearwardly from each chamfered end of the fitting center body construction. An inwardly inclined, circular lock is formed near the chamfered end to receive and lock thereon the cooperating circular, inwardly inclined projection means which projects radially inwardly in the associated hub construction. A circular, radially outwardly open groove is formed in each center body end intermediate the outwardly projecting shoulder and the inwardly inclined lock. In the preferred embodiment, the groove is rectangular in cross sectional configuration to receive and firmly seat therein a resilient gasket for self sealing arrangement between the respective ends of the fitting center body and each respective associated hub. Preferably, the gasket employed may be similar to the gasket disclosed in a copending application entitled "Pipe Bell and Gasket", which application was filed on June 23, 1980, Ser. No. 162,377 now U.S. Pat. No. 4,343,480. The lock junction means and the cooperating inwardly inclined projection means provide a self locking and self sealing arrangement between the fitting center body and the end hubs and eliminates the need for additional operations upon assembly of the parts such as solvent sealing and heat welding.

It is therefore an object of the present invention to provide an improved pipe fitting construction of the type set forth.

It is another object of the present invention to provide a novel pipe fitting construction wherein the fitting center body and end hubs are assembled without the need for solvent welding or chemical sealing of the parts.

It is another object of the present invention to provide a novel pipe fitting construction wherein the fitting center body and end hubs are assembled without the need for plastic welding or heat sealing of the parts.

It is another object of the present invention to provide a novel pipe fitting construction wherein the fitting center body and end hubs include self sealing and self locking cooperating construction features.

It is another object of the present invention to provide a novel pipe fitting construction including a center body having a lock junction at each of its ends and hubs which are connected to each said end, each hub being provided with an inclined circular projection to seat in and lock within one of the lock junctions to affix the hub to the fitting center body in a self locking, leak proof manner.

It is another object of the present invention to provide a novel pipe fitting construction wherein inlet and outlet ends of the fitting center body are each formed with an exterior circular shoulder, a circular lock and a circular gasket groove, a hub overfitting each said end and being seated upon the shoulder, each hub being formed to include an inclined inward projection to lock upon the circular lock and a gasket positioned within the groove to seal the interconnection between a center body end and its associated, locked hub.

It is another object of the present invention to provide a novel pipe fitting construction that is simple in design, inexpensive in manufacture and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

DESCRIPTION OF THE PREFERRED EMBODIMENT OF THE INVENTION

Figure 1:
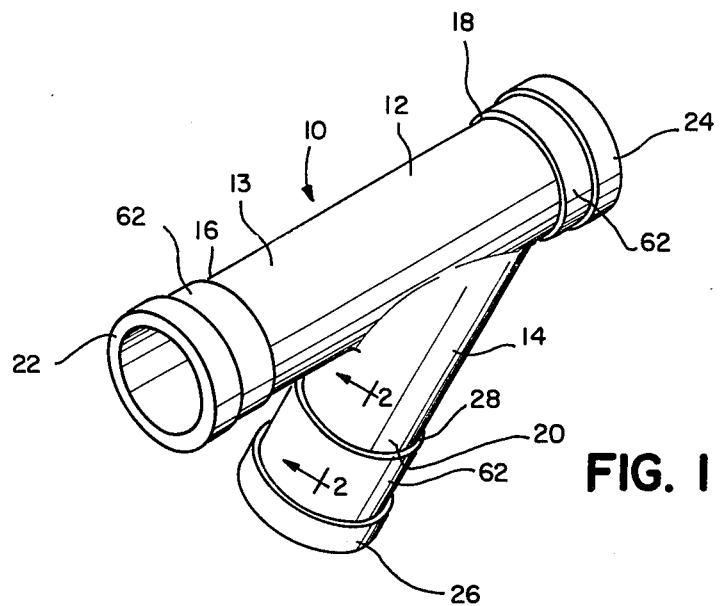
FIG. 1 is a perspective view of the pipe fitting construction of the present invention.

Although specific terms are used in the following description for the sake of clarity, these terms are intended to refer only to the particular structure of the invention selected for illustration in the drawings and are not intended to define or limit the scope of the invention.

Referring now to the drawings, there is illustrated a pipe fitting generally designated 10 of the type suitable for usual plastic pipe use, for example, drain lines. In the illustrative example, a fitting of twelve inch diameter will be described. However, fittings of larger or smaller diameter can be similarly constructed, and accordingly, all usual fitting sizes are considered to fall within the spirit and scope of this invention.

The fitting 10 comprises a central body 12 of desired configuration, such as the wye shape as illustrated. The central body 12 is formed with the in line conduit 13 and the branch conduit 14, which conduits include the fitting inlet ends 16, 20 and fitting outlet end 18. Inlet hubs 22, 26 respectively overfit and join the central body 12 at the inlet ends 16, 20. Similarly, an outlet hub 24 of the same configuration overfits and joins the central body 12 at the fitting outlet end 18. It is the essence of this invention to provide a self locking and self sealing interconnection between the respective central body ends and hubs 16, 22, 18, 24 and 20, 26. As above set forth, the respective hubs 22, 24, 26 can be of any known configuration and design, either with or without an internal groove for seating or sealing a gasket, as may be desired to interconnect the fitting 10 with pipe lengths (not shown) of a piping system.

Figure 2:
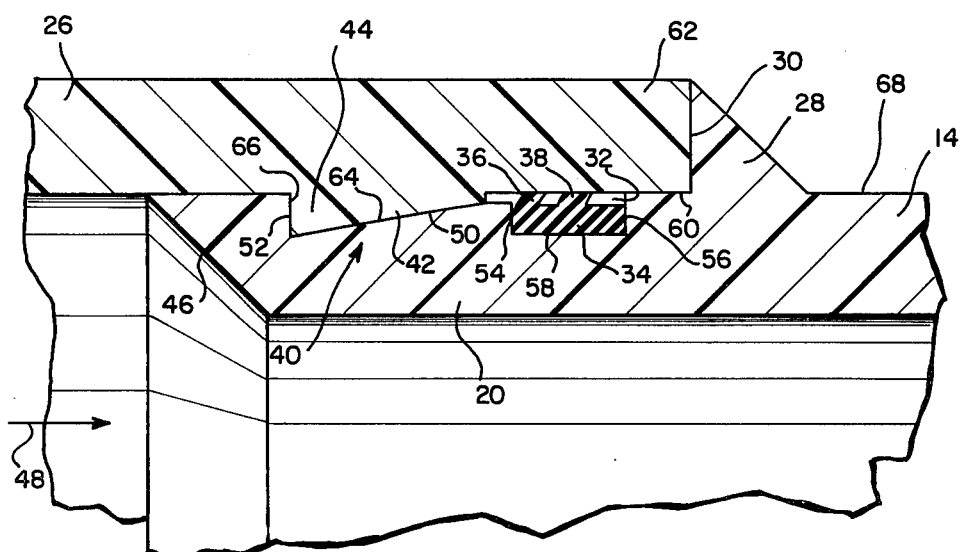
FIG. 2 is an enlarged, partial, cross sectional view, taken along line 2—2 on FIG. 1, looking in the direction of the arrows.
Figure 3:
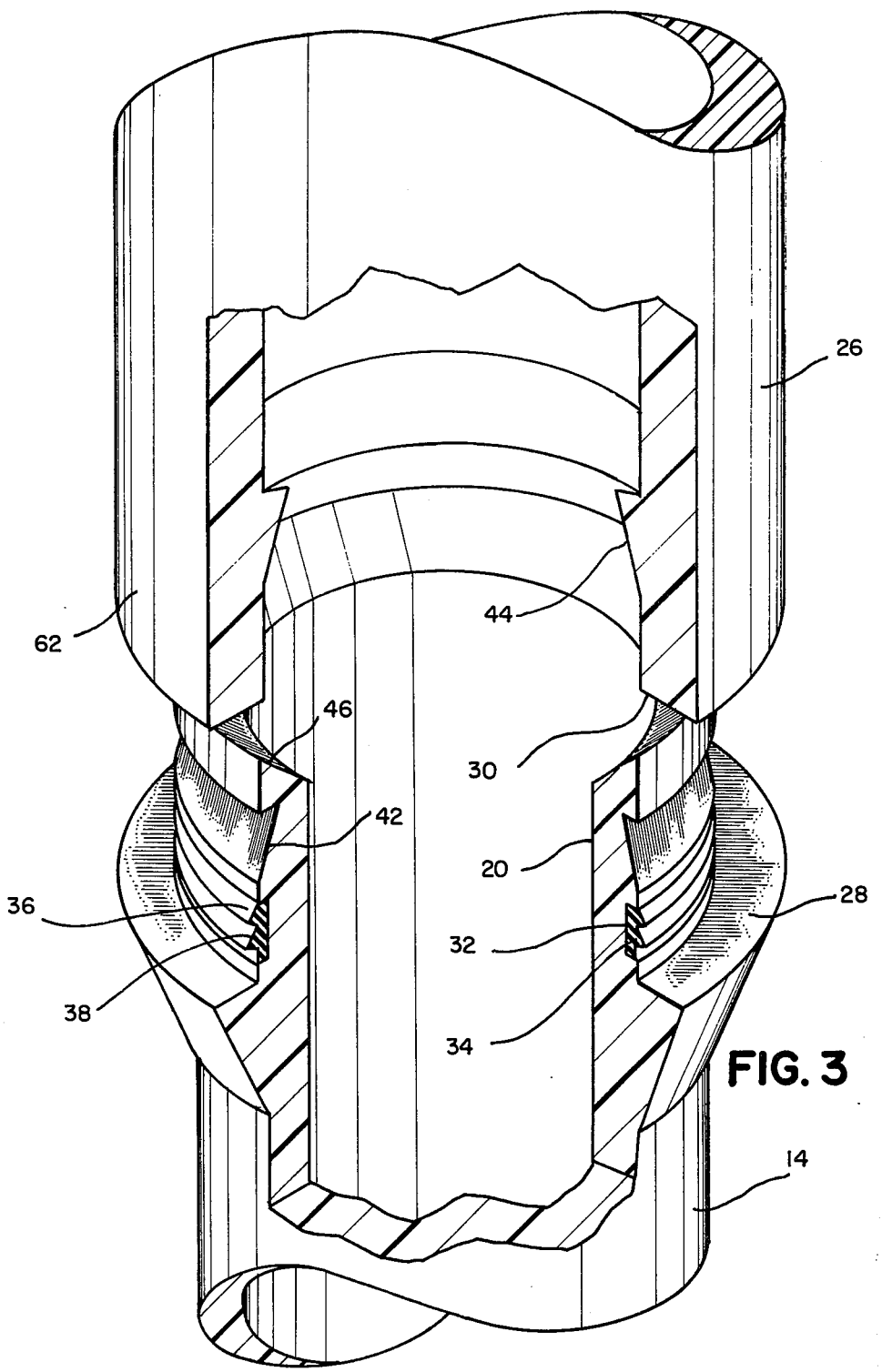
FIG. 3 is an enlarged, exploded, perspective view of one locking junction and associated hub, partially broken away to illustrate interior construction details.

Referring particularly to FIGS. 2 and 3, it will be seen that each end 16, 18, 20 of the central body 12 is molded or otherwise formed to provide a circular, radially outwardly extending shoulder 28. As best seen in FIG. 2, each hub 22, 24, 26 overfits its respective central body end 16, 18, 20 and is pressed inwardly until its end 30 rests upon and abuts against the shoulder 28. As illustrated, the shoulders 28 are spaced rearwardly from a respective end terminus 46 of the central body 12 and thus serve to set and limit the distance each end hub means 22, 24, 26 overfits its respective central body end 16, 18, 20 as the fitting 10 is assembled. Each shoulder 28 terminates in a plane that lies at right angles to the axis of the central body main or branch conduit 13, 14.

Each central body end 16, 18, 20 is molded, machined or otherwise treated, by using known plastic pipe forming techniques, to provide a lock junction means 40 for automatically and securely receiving and affixing a respective hub 22, 24, 26. The lock junction means 40 is rearwardly spaced from the central body end terminus 46 and is positioned intermediate the end terminus 46 and the circular shoulder 28. The lock junction means 40 comprises a circular lock 42 which is defined by a circular, inwardly inclined side 50 and an abutting, circular, radially outwardly extending side 52. As best seen in FIG. 2, each central body end 16, 18, 20 is additionally provided with an outwardly open, circular groove or recess 32 which is rearwardly spaced from the inward terminus of the inclined side 50 of the lock 42. Preferably, as shown, the circular groove 32 is formed with parallel sides 54, 56 which extend at right angles from the groove bottom 58, to receive and securely seat the resilient gasket 34 therein. As above set forth, the gasket means 34 is designed in accordance with the teachings of the said copending application. The gasket preferably includes a pair of inwardly spaced, integral, circular sealing rings 36, 38, which rings extend radially outwardly to bias and seal against a portion of the inner periphery 60 of a hub 22, 24, 26. Preferably, the gasket 34 is formed to the same general configuration as the circular recess 32 to firmly seat therein to prevent displacement when the fitting is assembled.

Still referring to FIGS. 2 and 3, each hub 22, 24, 26 includes a hollow, cylindrically formed connecting end 62 of size to tightly overfit the outer periphery of its associated central body end 16, 18, 20. The connecting end terminates inwardly at the hub end 30 and is provided with an inwardly inclined inner projection 44 of circular, arrow-like configuration to slip over the associated central body end 46 and to lock within the fitting central body lock 42. As illustrated, the inwardly inclined projection 44 cooperates with and locks inside of the central body lock 42 to prevent disassociation of the hubs 22, 24, 26 from the central body 12 once the fitting 10 has been completely assembled. Each inwardly inclined projection 44 includes an inclined side 64 of dimensions, position and inclination which are substantially identical to the dimensions, position and inclination of the corresponding inclined side 50 of the central body end lock 42. Similarly, each inwardly inclined projection 44 additionally includes a radially inwardly extending side 66 of dimensions and position which are substantially identical to the dimensions and position of the corresponding radially outwardly extending side 52 of the central body end lock 42. The corresponding radially extending sides 52, 66 engage and interlock, as best seen in FIG. 2, to prevent the hubs 22, 24 and 26 from being pulled or otherwise separated from the fitting central body 12 once the fitting 10 has been assembled. Each end 46 of the fitting central body 12 is preferably angularly formed to provide least resistance to the flow of liquids (not shown) as they enter the fitting 10 in the direction indicated by the arrow 48.

In one configuration, the fitting center body 12 was formed to a nominal 12 inch size having 12.5 inch outside diameter and wall thickness of 0.39 inches. The circular shoulders 28 were similarly dimensioned to project outwardly from the outer central body periphery a distance of 0.39 inches, thereby to engage and receive thereon the connecting end 62 of a conventional hub 22, 24, 26. In this configuration, the hubs 22, 24, 26 were fabricated in usual manner with inside diameter of 12.5 inches whereby the hub could be applied over the central body end 16, 18, 20 in a relatively tight engagement by applying axially directed forces and acknowledging the natural resiliency of the plastic material of the body and hubs. The inwardly inclined, circular projection 44 of each hub was formed to project radially inwardly from the hub interior periphery a maximum distance of 0.11 inches. Similarly, the circular lock 42 of the lock junction was formed to extend radially inwardly from the central body outer periphery a maximum distance of 0.11 inches and was formed to the same cross sectional configuration as the circular hub projection 44. Accordingly, as each hub was forced axially inwardly over its associated central body end, the circular projections 44 were forced into association within the respective locks 42. The plastic central body and hub components deformed as necessary to make up the locked junction between the parts and then naturally returned to substantially the unstressed dimensions and shape after the projection 44 was fully seated within the associated lock 42.

In order to assemble the fitting 10 to provide a self locking and self sealing construction, all of the ends 16, 18, 20 of the fitting central body are formed with the locking and sealing construction as shown in FIGS. 2 and 3. A circular, resilient gasket 34 is then seated within the central body end circular groove 32 with the sealing rings 36, 38 projecting peripherally beyond the outer periphery 68 of the central body ends 16, 18, 20. Each hub connecting end is formed with an inwardly inclined projection 44 for cooperation with the lock 42 provided in a central body end. The inner periphery 60 of the hub connecting end 62 is maintained to substantially the same diameter as the outer periphery 68 of the center body ends 16, 18, 20. After the parts 12, 22, 24, 26 have been formed as illustrated, eahc hub 22, 24, 26 is placed in axially aligned juxtaposition to its associated central body end 16, 18, 20 and then the hubs are urged inwardly over their respective associated central body ends. The natural resiliency of the plastic material comprising both the central body 12 and the hubs 22, 24, 26 allows sufficient movement or give by either or both flexing the central body ends 16, 18, 20 radially inwardly and the hub connecting ends 62 radially outwardly to permit the hub inward projection inclined side 64 to pass over the fitting end 46 sufficiently until the hub projection engages and fully seats within the central body end lock 42. In this position, the hub end 30 contacts in overall circular engagement the stop 28. The natural memory of the plastic material forming the central body 12 and the hubs 22, 24, 26 functions to naturally and quickly return the parts to their designed configurations and dimensions after the projection 44 seats in the lock 42 to thereby secure the parts together.

Although the invention has been described with a certain degree of particularity, it is understood that the present disclosure has been made only by way of example and that numerous changes in the details of construction and the combination and arrangement of parts may be resorted to without departing from the spirit and scope of the present invention.

What is claimed is:

1. A pipe fitting construction of large diameter comprising
   a central body of predetermined configuration and comprising at least one end having an end terminus,
   the said end being an annulus of hollow cylindrical configuration defined between an interior peripheral wall surface and an exterior peripheral wall surface and having a longitudinal axis;
   a lock junction means formed in the said end in rearward longitudinal spaced relation from the end terminus to provide a self locking interconnection,
      the lock junction means comprising a circular lock which is defined in part by an inclined side, the inclined side being inclined circularly inwardly from the exterior peripheral wall surface toward the interior peripheral wall surface,
      the lock junction means having no adhesive,
      the lock junction means defining a forward cylindrical portion of the annulus forwardly of the circular lock,
      the lock junction means comprising a radially extending shoulder which outwardly projects from the central body exterior peripheral wall surface,
      the shoulder having a planar front surface and a rear conical surface which extends from said planar front surface to said external peripheral wall surface, the shoulder being rearwardly spaced from the rearward portion of the annulus;
   a hub connected to the said central body end at the lock junction means to provide an enlarged connector for receiving an adjacent length of pipe,
      the hub having a connecting end circularly and outwardly adjacent to the central body end, the connecting end terminating in a planar end,
      the hub connecting end comprising a circular, inward projection of configuration matching said circular lock to lock within the said circular lock without adhesive; the shoulder planar front surface being contacted by the hub planar end when the circular inward projection of the hub locks within the circular lock of the lock junction means;
   a circular groove provided in the central body end, the groove being rearwardly spaced from the lock junction means, the groove being defined between front and rear groove sides,
      the groove sides lying in parallel planes extending at right angles from the longitudinal axis of the end,
      the central body end defining a rearward cylindrical portion of the annulus rearwardly of the rear groove side,
      portions of the hub connecting end overlying and contacting the said forward and rearward portions of the annulus; and
   gasket means seated within the groove to seal the connection between the hub connecting end and the said central body end,
      a portion of the gasket means biasing directly against the hub connecting end in the absence of any adhesive,
      the gasket means sealing the said connection between the central body end and the hub connecting end without adhesive;
   whereby a multiple part, self locking and self sealing pipe fitting is provided.

2. The pipe fitting construction of claim 1 wherein the contact between the hub and the planar front surface of the shoulder is circular.

3. The pipe fitting construction of claim 1 wherein the circular lock is further defined by a side which extends radially outwardly from an end portion of the said inclined side.

4. The pipe fitting construction of claim 3 wherein the hub circular projection extends completely circularly about the said hub connecting end.

5. The pipe fitting construction of claim 4 wherein the hub circular projection is defined by an inclined side and a contiguous, radially aligned side.

6. The pipe fitting construction of claim 5 wherein the radially aligned side of the projection abuts directly the radially extending side of the lock without adhesive to prevent disassociation of the connecting end of the hub from the said central body end.

7. The pipe fitting construction of claim 6 wherein the circular lock is spaced forwardly from the said shoulder and the said groove.

* * * * *